United States Patent [19]

Ohsawa

[11] Patent Number: 4,897,807

[45] Date of Patent: Jan. 30, 1990

[54] SWITCH DATA INPUT DEVICE

[75] Inventor: Toshifumi Ohsawa, Kanagawa, Japan

[73] Assignee: Canon Kabushiki Kaisha, Tokyo, Japan

[21] Appl. No.: 139,971

[22] Filed: Dec. 31, 1987

[30] Foreign Application Priority Data

Jan. 12, 1987 [JP] Japan .................................. 62-4588

[51] Int. Cl.[4] ........................... G06F 1/00; G06F 3/00
[52] U.S. Cl. .................................. 364/707; 364/709.12
[58] Field of Search ............... 364/707, 709.01, 709.12

[56] References Cited

U.S. PATENT DOCUMENTS

| 4,109,315 | 8/1978 | Pan ...................................... 364/707 |
| 4,158,230 | 6/1979 | Washiyuka et al. ................. 364/707 |
| 4,285,043 | 8/1981 | Hashimoto et al. ................. 364/707 |
| 4,365,290 | 12/1982 | Nelms et al. ........................ 364/707 |
| 4,381,552 | 4/1983 | Nocilini et al. ..................... 364/707 |
| 4,419,917 | 12/1983 | Sato ..................................... 364/707 |

Primary Examiner—David L. Clark
Assistant Examiner—Dale M. Shaw
Attorney, Agent, or Firm—Fitzpatrick, Cella, Harper & Scinto

[57] ABSTRACT

A switch data input device includes a plurality of switches, an interrupt signal generating circuit responsive to on and off states of the respective switches for producing an interrupt signal having a prescribed pulse width, and a data processing circuit receptive of the interrupt signal and responsive to presence of the interrupt signal for reading the on and off states of the respective switches as data and having a program for executing a processing according to the read data, wherein after the completion of execution of the data reading and data processing, the data processing circuit comes into a waiting state.

7 Claims, 10 Drawing Sheets

SWITCH DATA INPUT DEVICE

BACKGROUND OF THE INVENTION

1. Field of the Invention:

This invention relates to a switch data input device for reading the on-off states of switches and, more particularly, to such a device which is used in cameras.

2. Description of the Related Art:

The camera or like instrument has its electrical circuitry made operational with the electrical power source restricted in availability to what is called battery. The microcomputer introduced into such a system has, therefore, generally a program that enables the consumption of electrical energy from the battery to be saved as much as possible. To this end, the microcomputer usually waits for an interrupt signal. During this waiting time (or in the so-called "HALT" state), the consumed current is limited to as little as 10 microamperes or thereabout. In response to an external event that whichever of the switches changes from the open (off) state to the closed (on) state, or an interrupt signal, the program of the microcomputer is initiated to run so that the state of the switch is read in, and a corresponding data handling routine to the read data is executed.

And, to this purpose, the conventional device was so constructed that so long as the switch was left unchanged from the "on" state to the "off" state, the interrupt signal substantially continued being produced. In other words, the interrupt capability was not more than that, under the condition that the first switch is in the "on" state, even if another or second switch is turned on, no more interrupt signal representing the new event is produced. By the given interrupt signal, therefore, it was impossible to discriminate between the successive events.

To compensate for this, according to the prior art, the switch data input device was provided with a program that if any successive two cycles of reading the state of the first switch have the same result, transferring to the HALT state is effected. If not the same result, then, as it implies that another switch has been turned on, a special routine dealing with the new event is executed.

The conventional device of such structure, because of the necessity of carrying out all but one cycle of reading operation of the first switch in vain until another switch changes its state, had a drawback that too much electrical power was consumed wastefully.

Also, the program for the microcomputer must include the special routine in which, as has been described above, the switch data (also called "key input") of the preceding cycle is put in the memory or RAM, then a newly read key input is compared with it, and then the comparison result is tested. The software to be used became redundant and the programming work became troublesome and time consuming.

The foregoing example of the conventional device is described in greater detail below.

In FIG. 9, the microcomputer μCOM enclosed within a dashed line block has eight key input terminals IN0–IN7 to which are connected respective switches SW0–SW7 at their throws, of which the movable poles are grounded (connected to circuit earth). In the example of FIG. 9, therefore, when any of the switches (SW0–SW7) turns on (is closed), the potential at the corresponding input terminal changes to a low level. Pull-up registers R0–R7 for the terminals IN0–IN7 maintain the respective input data at logic-1 (assuming a high level) when the switches are open. CPU represents the core of the microcomputer or is a so-called central processing unit including a ROM (read-only memory), RAM (random-access memory) and ALU (arithmetic and logical unit) as is well known in the art. When at least one of the switches SW0–SW7 turns on, a D-type flip-flop DFFR produces an interrupt signal INTR. Responsive to this signal, the CPU executes the corresponding task for the data from the switches SW0–SW7 through read buffers BUF0–FUP7 in the form of tri-state buffers. The inputs of the buffers BUF0–BUF7 are connected to the input terminals IN0–IN7 and their outputs are connected to data bus lines D0–D7 respectively. The enable-to-output terminals of the buffers BUF0–BUF7 all are connected to a common line at which a read enable signal RDEN from the CPU appears. When read out information concerning the binary logic at the input terminals IN0–IN7, the CPU changes the signal RDEN to a high level, thereby the outputs of the buffers BUF0–BUF7 are transferred thereto through the data bus lines D0–D7.

NAND is an 8-input NAND gate (in the instance of FIG. 9, described by negative logic) responsive to a low level at any one of its eight inputs for producing an output at a high level. When the output of the NAND gate NAND changes from a low to high level, the D-type flip-flop DFFR, because of its D-terminal being set always at a high level, changes and maintains its Q output to a high level until the potential at its "reset" input R later reaches a high level.

With the switch data input device of such construction, when any one of the switches SW0–SW7 turns on, the corresponding one of the input terminals IN0–IN7 reaches a low level, causing the output of the NAND gate NAND to change from a low to a high level. Therefore, the output Q of the D-type flip-flop DFFR reaches a high level. Thus, the interrupt signal INTR that requests the CPU to interrupt a running program in response to the key input. As the CPU recognizes this signal INTR, when the execution of the interrupt routine is initiated, its output signal INTCLR is changed to a high level to reset the D-type flip-flop DFFR. Hence, the signal INTR is removed to render the CPU responsive to the next interrupting event. Now assuming that any of the switches SW0–SW7 is left in the "on" state, then the output of the NAND gate NAND retains a high level. Therefore, even if another switch turns on later, a new interrupt signal never generates as has been described above. So, it has been the practice in the prior art to test if another switch has been turned on in such a way that after the completion of execution of a step #5 of FIG. 10 for the corresponding task (data handling) to the first key input, a vain interrupting operation shown in steps #6–#8 is always carried out.

Therefore, the conventional device had drawbacks that the consumption of electrical power was increased by always performing vain reading operation and the program became redundant.

The circuit of FIG. 9 further includes an electrical power source or battery BAT of which the power supply line is connected to the microcomputer μCOM, a PNP transistor TR, a resistor $R_{BE}$ and another integrated circuit IC which is controlled by the microcomputer μCOM through control and data buses BUS. When the microcomputer μCOM changes its output signal $V_{ON}$ to a low level, the transistor TR is turned on to supply current from the battery BAT to the integrated circuit IC therethrough.

SUMMARY OF THE INVENTION

An object of the present invention is to eliminate the above-described drawbacks of the prior art and to provide a switch data input device which enables the energy loss to be minimized.

To achieve this object, according to the invention, a switch data input device includes a plurality of switches, interrupt signal generating means responsive to on and off states of the respective switches for producing an interrupt signal having a prescribed pulse width, and a data processing circuit receptive of the interrupt signal and responsive to presence of the interrupt signal for reading the on and off states of the respective switches as data and having a program for executing a processing according to the read data, wherein after completion of execution of the data reading and the data processing, the data processing circuit comes into a waiting state.

Further objects and features of the invention will become apparent from the following detailed description of preferred embodiments of the invention by reference to the drawings.

DETAILED DESCRIPTION OF THE PREFERRED EMBODIMENTS

Figure 1:
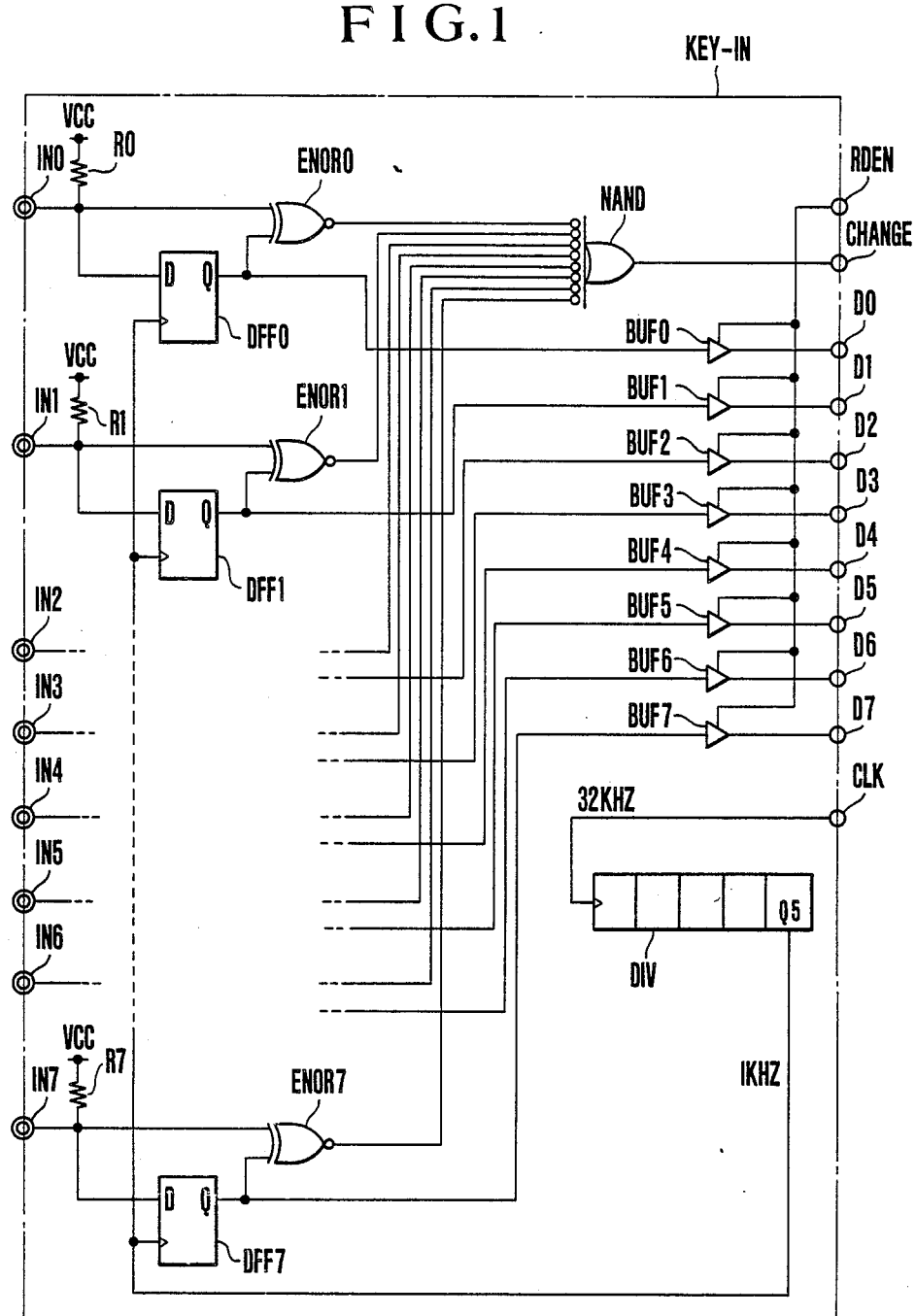
FIG. 1 is an electrical circuit diagram of the main parts of an embodiment of the switch data input device according to the invention.
Figure 2:
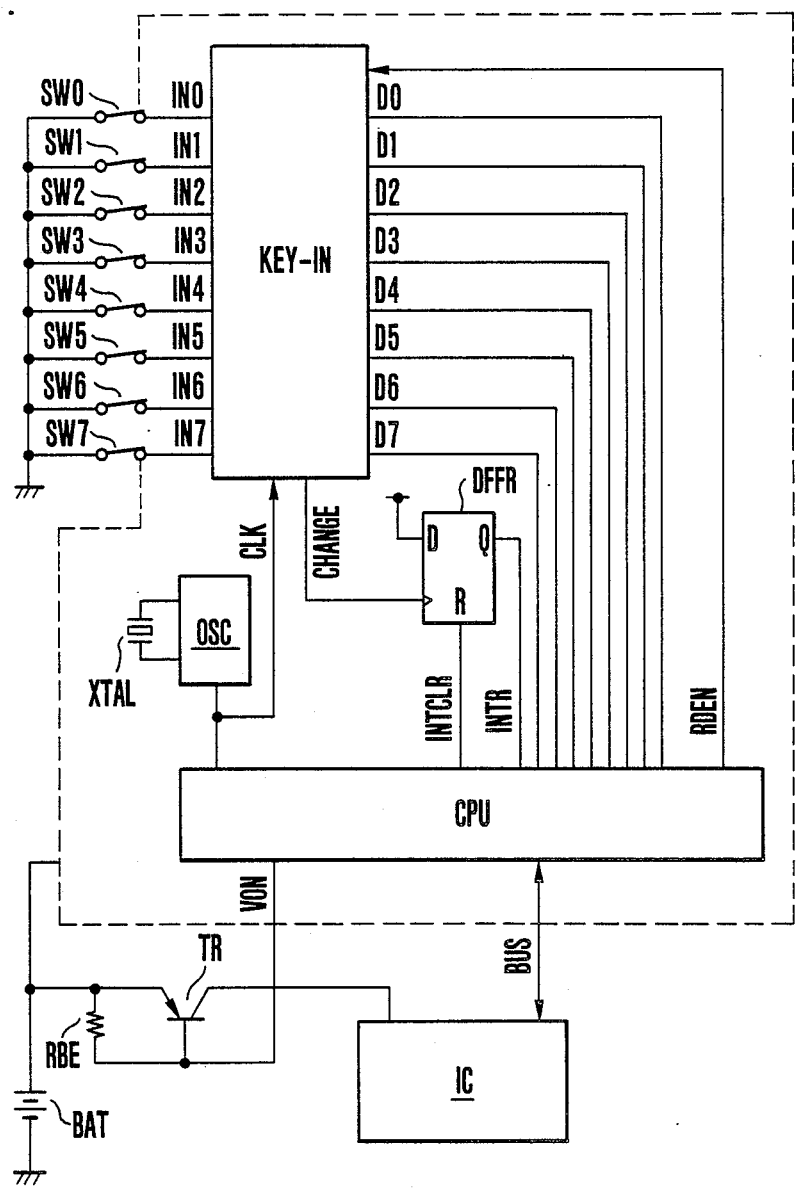
FIG. 2 illustrates the structure of the parts of the microcomputer incorporated in the input device of FIG. 1.
Figure 9:
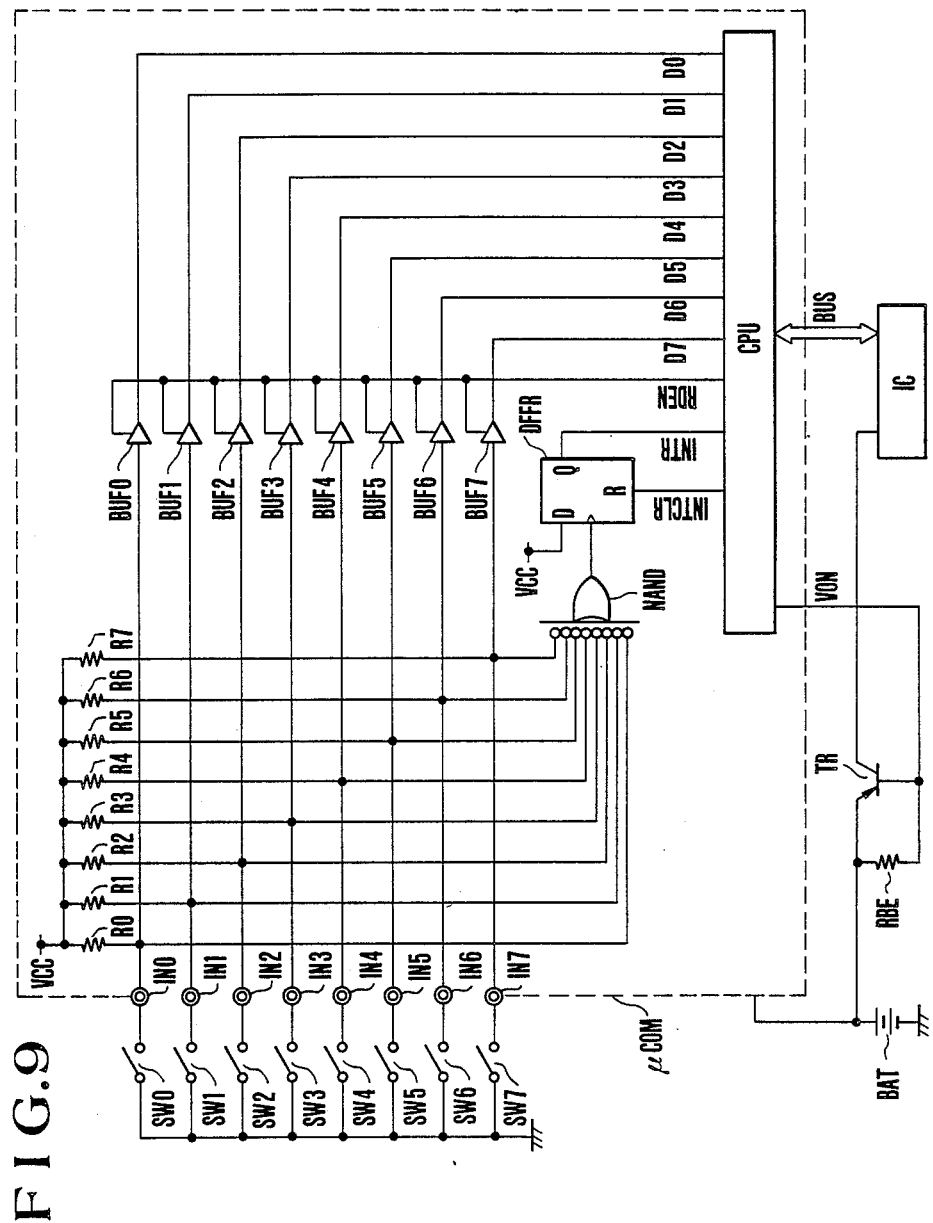
FIG. 9 is an electrical circuit diagram of the main parts of the microcomputer having the conventional switch data input device built therein.
Figure 10:
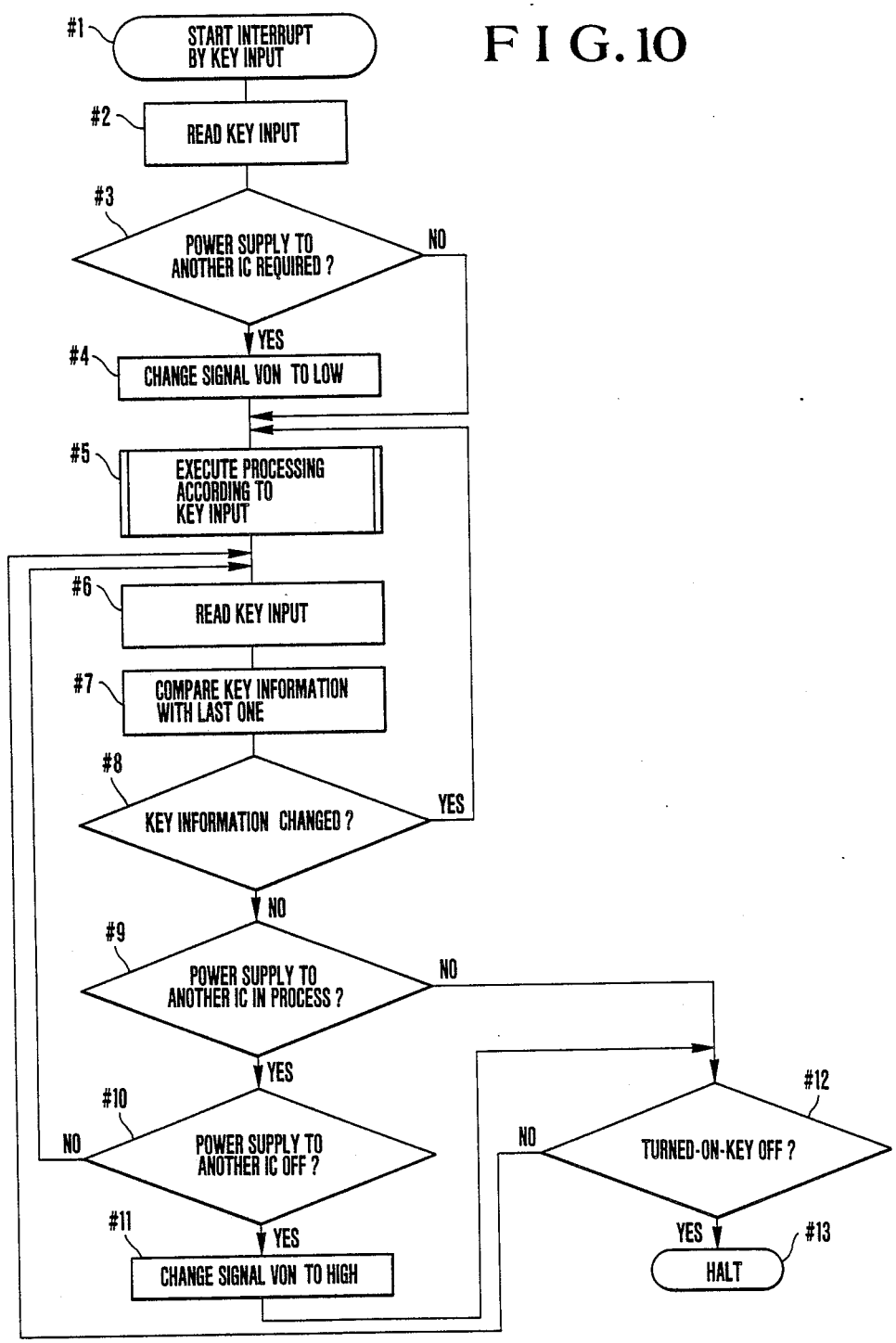
FIG. 10 is a flowchart for the circuit of FIG. 9.

FIG. 1 is a diagram illustrating the main parts of one embodiment of the switch data input device according to the invention, and FIG. 2 shows an example of arrangement of the input device of FIG. 1 incorporated in the microcomputer. The internal circuit of a block labeled KEY-IN of FIG. 2 is shown in FIG. 1. In FIGS. 1 and 2, the like constituent parts to those of the circuit of FIG. 9 are denoted by the same reference characters, and their explanation is omitted. What is characteristic of this embodiment is that, in the switch data input portion, the input terminals IN0–IN7 are provided with respective individual comparison circuits comprising D-type flip-flops DFF0–DFF7 and exclusive NOR gates ENOR0–ENOR7.

In FIG. 1, DFF0–DFF7 are the D-type flip-flops; ENOR0–ENOR7 are the exclusive NOR gates. DIV is a 5-stage frequency dividing circuit receptive of the output of an oscillator circuit OSC at its clock terminal CLK for producing a train of pulses with a frequency equal to 1/32 of the frequency of the input clock at an output terminal Q5. The exclusive NOR gates ENOR0–ENOR7 are connected at their one inputs to the input terminals IN0–IN7 respectively, and at their other inputs to the Q outputs of the D-type flip-flops DFF0–DFF7. The D-type flip-flops DFF0–DFF7 have their D inputs connected to the input terminals IN0–IN7 respectively and their clock terminals receive clock supply for data latching from the common output terminal Q5 of the frequency dividing circuit DIV. Now assuming that the frequency of the input clock at the CLK terminal is 32 kHz, then the frequency of the output at the stage Q5 of the frequency dividing circuit DIV becomes 1 kHz. Therefore, the D-type flip-flops DFF0–DFF7 latches the input levels of the input terminals IN0–IN7 at a sampling rate of 1 kHz. If there are no changes in the input levels, then the two inputs of every one of the gates ENOR0–ENOR7 are equal to each other. Thus, the outputs of the gates ENOR0–ENOR7 all are at a high level. Hence the NAND gate NAND produces an output signal CHANGE at a low level. Suppose the switch SW0 is turned on to change the potential at the input terminal IN0 from a high to low level. Then, during the time from this moment to a moment at which the rising edge of the following pulse of 1 kHz, because the two inputs of the gate ENOR0 are differing from each other, since the input connected to the terminal IN0 is at a low level, and the other input connected to the output Q of the D-type flip-flop DFF0 is at a high level, the output of the corresponding comparison circuit remains at a low level. Thereby, the output of the NAND gate NAND is changed to and maintained at a high level for this period. Conversely when the switch SW0 turns off to change the potential at the input terminal IN0 from a low to high level, the two inputs of the gate ENOR0 also become different from each other, because the IN0 side input is at a high level, and DFF0-Q side input is at a low level. The difference continues until the rising edge of the following pulse of 1 kHz comes. During this time, the output of the comparison circuit is at a low level again. Therefore, the output of the NAND gate NAND is changed to and maintained at a high level for this time.

Figure 5:
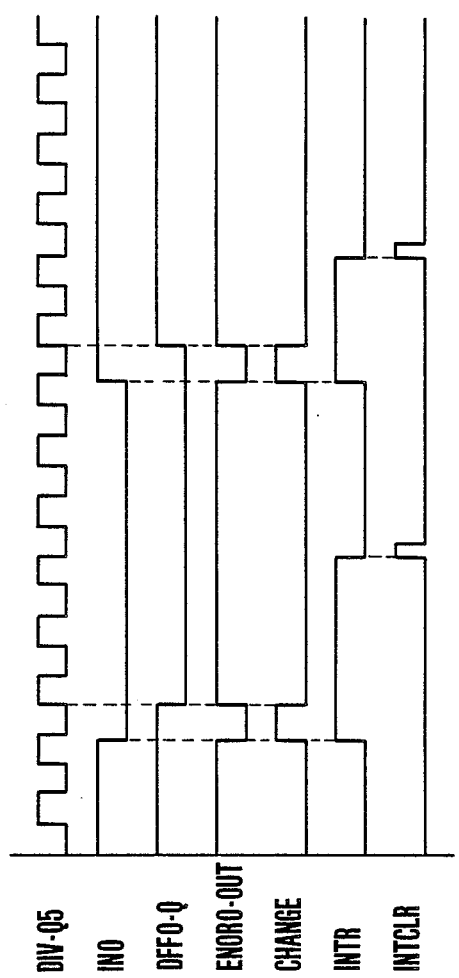
FIGS. 5 and 6 are timing charts of the circuits of FIGS. 1 and 4, respectively.

Since the foregoing operational principle is valid for each member of the group of the input terminals IN1–IN7, the circuit of FIG. 1 can read a change of any one of the input levels regardless of its polarity of change and what level the other inputs have, and produces the output signal CHANGE as the read result in the form of a pulse of short duration (see FIG. 5).

In application of the switch data input device of such structure to a microcomputer for use in the single lens reflex camera, its arrangement is made as shown in FIG. 2, where XTAL is a quartz oscillator constituting part of an oscillation circuit OSC.

The clock output of the oscillation circuit OSC is supplied not only to the CPU receptive of the interrupt signal INTR and responsive to presence of that interrupt signal for reading in the on-or-off states of the above-described plurality of switches as data to execute the corresponding routine to the read data, but also to the circuit KEY-IN constituting the essential part of the switch data input device.

The operation of the first embodiment having such constructional features is described below.

Figure 3:
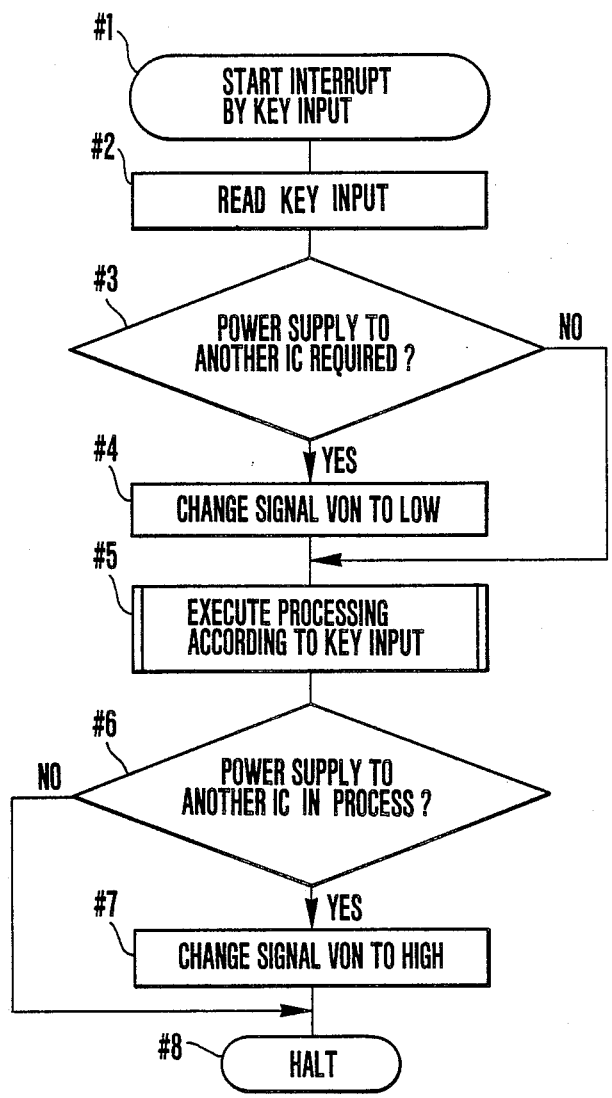
FIG. 3 is a program flowchart for the microcomputer of FIG. 2.

In the microcomputer of FIGS. 1 and 2, when the state of the key input changes, the circuit KEY-IN produces the output signal CHANGE of prescribed width (see FIG. 5). Responsive to this signal, the D-type flip-flop DFFR changes its output or interrupt signal INTR to a high level, and maintains it for a predetermined time. Thus, the CPU is interrupted (in a step #1 of FIG. 3). In other words, despite that the switch (KEY) is held in the "on" state, since the signal CHANGE (FIG. 5) is formed to a pulse of prescribed width, the reset signal INTCLR is not allowed to change the interrupt signal to a high level again. Therefore, the program for the CPU after having executed the interrupt routine as shown in FIG. 3 at the step #2 does not need to perform the task which would otherwise compare the presently read states of the switches SW0-SW7 with the previous read ones and test the comparison result as in the prior art described in connection with FIG. 9, and further to continue wastefully running until the once closed one of the switches SW0-SW7 is opened. Further, as soon as the completion of execution of the routine dealing with the read states of the switches in a step #5 (see FIG. 3), the microcomputer can transit to the HALT (waiting) state (see a step #8 in FIG. 3). For this reason, the software becomes simpler, and the consumption of electrical power is lessened.

It is noted that the step #3 of FIG. 3 is to supply current to the integrated circuit IC (see FIG. 2) having built-in programs for the operations of the automatic focus adjustment mode and the exposure control modes including light metering and releasing the shutter of the single lens reflex camera for the purpose of determining whether or not the other actions than the interrupt one should be carried out. If the current supply must be carried out, then the signal $V_{ON}$ of the CPU is caused to change to a low level in a step #4, thereby the transistor TR is turned on. While the integrated circuit IC is supplied with current, the corresponding task to the read information of the switches SW0-SW7 is carried out in the step #5. In a step #6, if current being supplied to another IC is tested. If not, a jump to a step #8 occurs immediately, rendering the microcomputer to HALT. Otherwise, to the energy saving purpose, the output signal $V_{ON}$ of the CPU is changed to a high level to turn off the transistor TR. Then, the program returns to the HALT (waiting) step. Thus, the consumption of electrical energy of the entire apparatus is limited to a minimum.

Another embodiment of the invention is next described only in the different feature from that of the first embodiment. The like parts to those of the first embodiment are denoted by the same reference characters and are not again explained.

Figure 4:
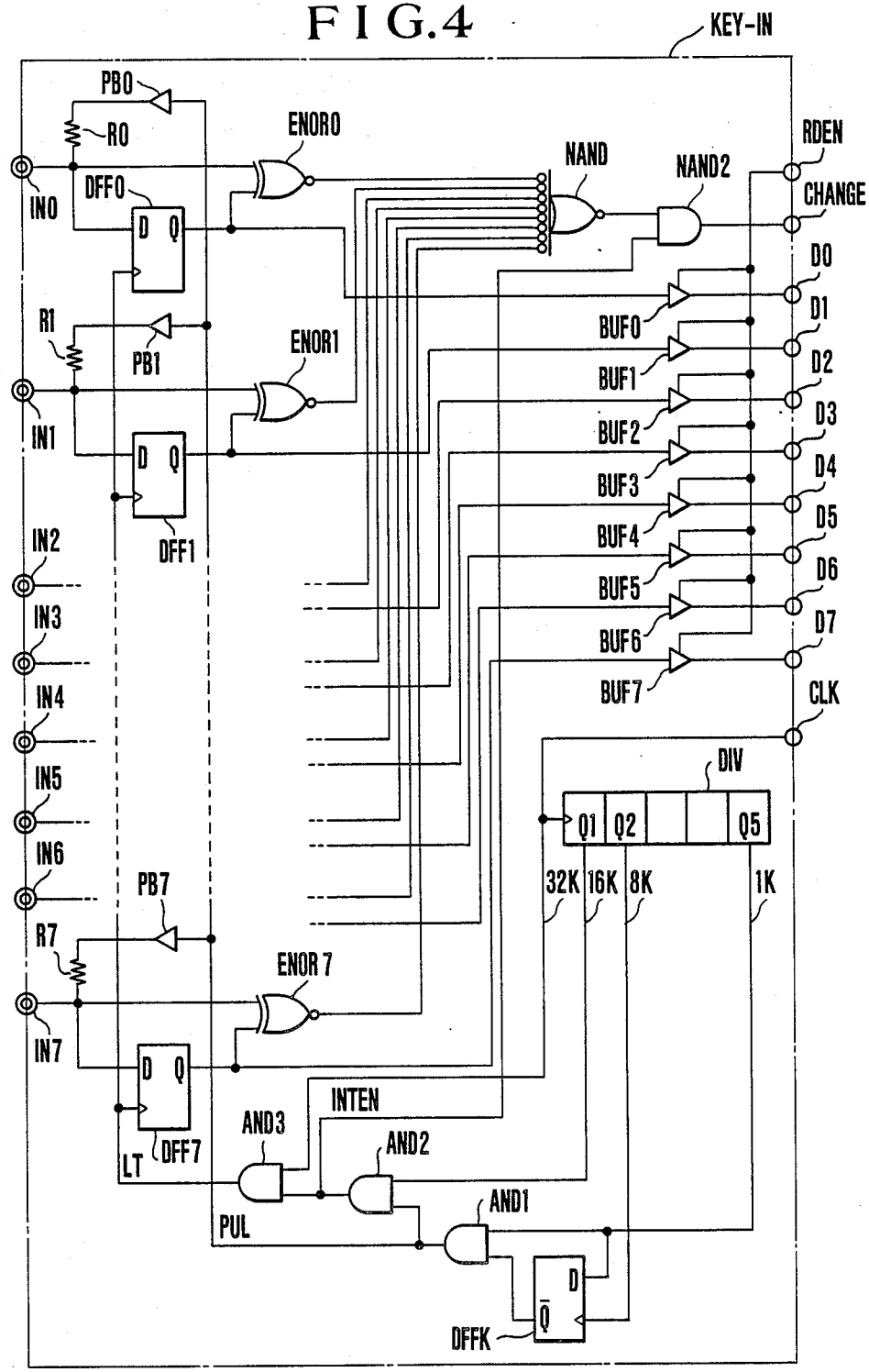
FIG. 4 is similar to FIG. 1 except a second embodiment of the invention is illustrated.

The circuit of FIG. 4 has a feature that the pulling-up of the input terminals IN0-IN7 is made dynamically driven with an advantage of achieving a further improvement of the energy saving.

Figure 6:
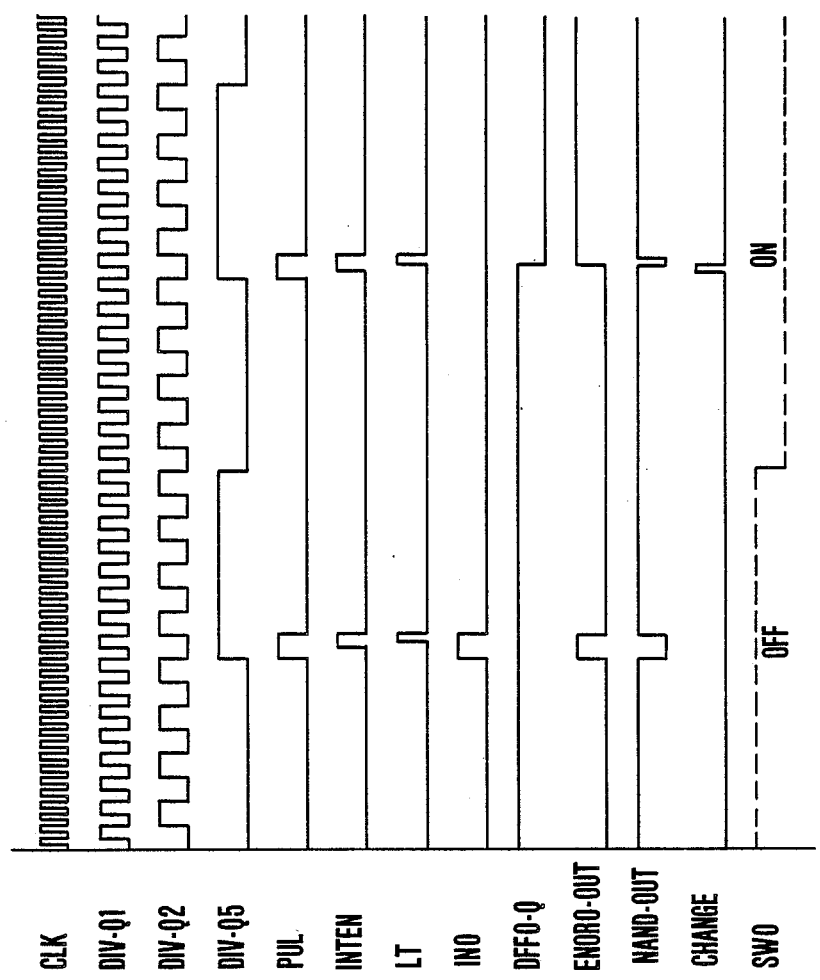

In the circuit of FIG. 4, AND gates AND1, AND2 and AND3, a D-type flip-flop DFFK and the frequency dividing circuit DIV constitute a circuit for producing a control signal for dynamic driving the pulling-up and a timing signal which allows the signal CHANGE to be produced only when the pulling-up action is carried out. A timing chart illustrating the manner in which the circuit of FIG. 4 operates is shown in FIG. 6. In the circuit of FIG. 4, the frequency dividing circuit DIV divides the frequency of the input clock at the CLK terminal, and produces a clock with a frequency equal to ½ of the frequency of the signal CLK at the first output terminal Q1 which is applied to one of the two inputs of the AND gates AND2, a clock with a frequency equal to ¼ of the frequency of the signal CLK at the second output terminal Q2 which is applied to the clock terminal of the D-type flip-flop DFFK, and the clock with the frequency equal to 1/32 of the frequency of the signal CLK at the output terminal Q5 which is applied to the D input of the D-type flip-flop DFFK and one of the two inputs of the AND gate AND1. The D-type flip-flop DFFK and the AND gate AND1 constitute a one-shot circuit. As shown in FIG. 6, each time the output Q5 of the frequency dividing circuit DIV changes from a low to high level, the one-shot circuit produces a pulse PUL whose width is equal to a half of the period of the output clock from the output terminal Q2 of the frequency dividing circuit DIV. The pulse PUL becomes a signal for pulling up the input terminals IN0-IN7 in timing at each period. For this purpose, it drives buffers PB0-PB7 for pulling up so that the one ends of the pull-up resistors R0-R7 are pulled up to a high level only when the pulse PUL is at a high level. Since the pulse PUL is applied also to one input of the AND gate AND2, the AND gate AND2 produces a pulse INTEN of which the time width is equal to ½ of that of the pulse PUL. Since the pulse INTEN is applied to one input of a NAND gate NAND2, the signal CHANGE representative of whichever of the input terminals has changed is rendered effective only during the time when the pulling-up action is going on. The pulse INTEN is further applied to one input of the AND gate AND3 where it is ANDed with the signal CLK to become a pulse LT whose time width is equal to ½ of that of the pulse INTEN.

The pulse LT becomes a clock input for the D-type flip-flops DFF0-DFF7, thus functioning as a latch signal for latching in the D-type flip-flops DFF0-DFF7 those levels of the potentials at the input terminals which are checked during the time when the dynamic pulling-up action is being carried out.

In FIG. 6, on assumption that all the switches SW0-SW7 have so far been open, then when the switch SW0 turns on at a timing as shown on line SW0 in FIG. 6, the initiation of that cycle of performance of the pulling-up action which soon follows the change of the switch SW0 is waited for. Then, at a time during the time when this cycle of the pulling-up action is being carried out, the signal CHANGE reaches a high level. Thus, the interrupt signal is obtained when this circuit is used in replacement of the circuit KEY-IN of the microcomputer of FIG. 2.

It is noted that the operation of the other circuit portions is substantially similar to that described in connection with the first embodiment, and not again explained here.

Figure 7:
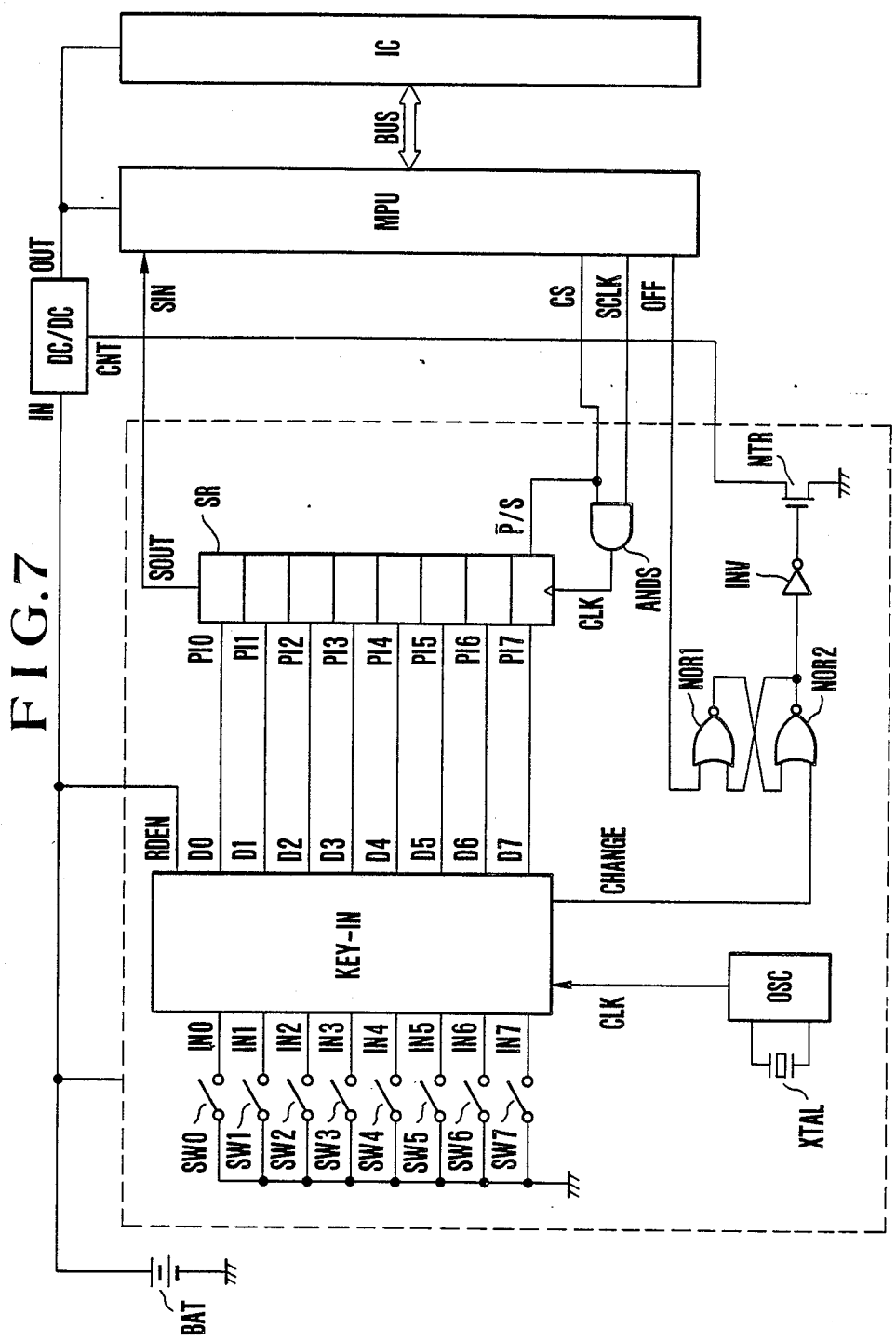
FIG. 7 is an electrical circuit diagram of the main parts of a third embodiment of the invention.

FIG. 7 shows an example of construction of a system in which the switch data input device of the invention is always supplied with current from the battery independently of the other circuit portions such as IC and MPU which are supplied with current only when necessity arises. Since the microcomputer whenever in use consumes a considerably large current even when HALTing, for it is desired at any cost that the current supply to the microcomputer is cut off when the actuation of the system or key board is waited for, the key input portion is separated as shown by enclosure within a dashed line block of FIG. 7 to permit current to be always supplied thereto, and the current supply to the microcomputer MPU is controlled advantageously.

In FIG. 7, KEY-IN is any of the key input circuits shown in FIGS. 1 and 4. SW0–SW7 are keys (switches) connected to the input terminals IN0–IN7; XTAL is a quartz oscillator; OSC is an oscillation circuit; INV is an inverter gate; NOR1 and NOR2 are NOR gates; ANDS is an AND gate; NTR is an N-ch MOS transistor; SR is a parallel-in-serial-out type shift register; DC/DC is a DC-DC converter; BAT is an electrical power source or battery; IS is another integrated circuit; BUS is a bus for supplying and accepting data between the other integrated circuit IC and the microcomputer MPU. The circuit KEY-IN is always supplied with current from the battery BAT and samples input information at a rate depending on the signal CLK supplied from the circuit OSC. If the state of the key input is different from the previous one, the signal CHANGE is generated. Such a procedure is similar to that described in connection with the foregoing embodiments. The NOR gates NOR1 and NOR2 and the inverter INV form an S-R latch. When the circuit KEY-IN changes the signal CHANGE to a high level in response to the change of the key input state, the output of the inverter INV reaches a high level, turning on the transistor NTR. It is noted that because of the latch circuit, the output of the inverter INV is held at a high level so long as the microcomputer MPU changes the signal OFF to a high level. Thus, the transistor NTR continues conducting. When the transistor NTR turns on, the drain electrode of the transistor NTR drops nearly to GND (ground) level, setting the terminal CNT of the converter DC/DC to low level. When this terminal reaches a low level, the converter DC/DC starts to operate. Therefore, the microcomputer MPU and the integrated circuit IC are supplied with current.

Figure 8:
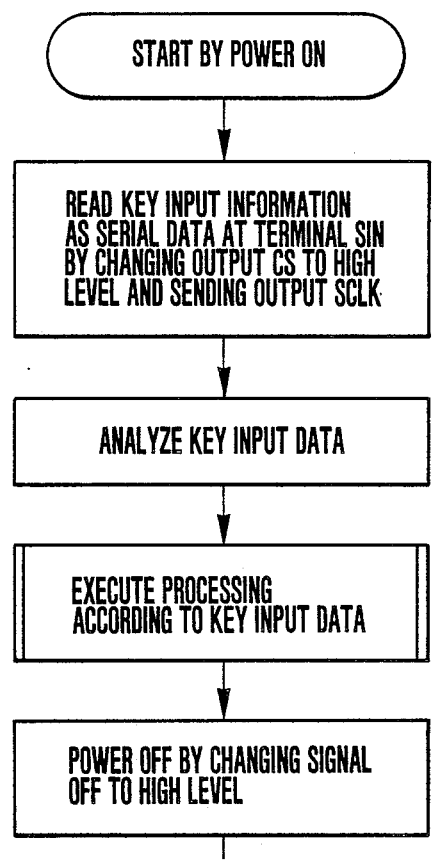
FIG. 8 is a program flowchart for the microcomputer used in the embodiment shown in FIG. 7.

After the start of the current supply, the microcomputer MPU operates according to the flowchart of FIG. 8.

Because the microcomputer MPU and the switch data input device are separated from each other, it is assumed here that the serial communication of data is performed so that the microcomputer MPU can get key input information from the switch data input device. The shift register SR operates in serial transfer mode when its $\overline{P/S}$ terminal is at a high level, and in parallel input mode when at a low level. So long as the serial communication as usual is not performed, the output CS reaches a low level. Therefore, the shift register SR operates in the parallel input mode, accepting the outputs D0–D7 of the key input circuit KEY-IN at its input terminals P10–P17. Thus, the key information is preset in the shift register SR. When the output CS is changed to a high level to permit the microcomputer MPU to read the key information, the operation of the shift register SR transits to the serial transfer mode in which the the output SCLK produced from the microcomputer MPU is applied through the AND gate ANDS to the terminal CLK of the shift register SR and the preset data of the terminals P10–P17 are produced in sequence from an output terminal SOUT depending on the output SCLK, and applied to a terminal SIN of the microcomputer MPU. Upon completion of the data handling, the microcomputer MPU changes the signal OFF to a high level at which the output of the above-described SR latch is inverted to turn off the transistor NTR, thereby the converter DC/DC is rendered inoperative, and the current supply to the microcomputer MPU is cut off. While leaving only the key input circuit KEY-IN to continue operating, the other circuit portions return to the stand-by state.

As has been described above, the soft load of the microcomputer can be reduced, and the electrical power consumption can be reduced to several tenths to several hundredths of that which would otherwise result when the system is wastefully operated in the other time than that when the invention is applied.

While a specific embodiment of the invention has been shown and described in detail to illustrate the application of the inventive principles, it will be understood that the invention may be embodied otherwise without departing from such principles.

What is claimed is:

1. A switch data input device comprising:
    a plurality of switches, each having an on-state and an off-state;
    interrupt signal generating means responsive to the on-state of said respective switches for producing an interrupt signal having a prescribed pulse width duration shorter than the time width of the on-state; and,
    data processing circuit means, receptive of said interrupt signal and responsive to presence of the interrupt signal, for reading the on-state and the off-state of said respective switches as data, and having a program for executing a processing operation according to the read data, said data processing circuit reverting to a waiting state after completion of execution of the data reading and data processing operations.

2. A switch data input device, according to claim 1, wherein said interrupt signal generating means includes a binary logic circuit which is set in response to said respective switches coming into the on-state and reset by a signal applied before completion of the on-state of said switches.

3. A switch data input device according to claim 2, wherein said binary logic circuit includes a flip-flop circuit.

4. A switch data input device according to claim 3, wherein said flip-flop circuit includes a D type flip-flop circuit having an input terminal connected to a corresponding switch.

5. A switch data input device comprising:
    a plurality of manually operable switches, each having a first state for setting data and a second state different from said first state;
    means for generating a control signal having a pulse width duration shorter than the time width of said first state of said respective switches in response to said first state; and
    data processing circuit means, responsive to the control signal for reading the state of each of said switches as data, and having a program for executing a processing operation according to the read data, said data processing circuit means reverting to a waiting state after completion of execution of the data reading and data processing operations.

6. A switch data input device according to claim 5, wherein said second state of each of said switches is a state in which data are not set.

7. A switch data input device comprising:
    at least one manually operable switch having a first state for setting data and a second state different from said first state;

means for generating a control signal having a pulse width duration shorter than the time width of first state of said switch in response the first state; and
data processing circuit means, responsive to the control signal for reading the state of the switch as data, and having a program for executing a processing operation according to the read data, said data processing circuit means reverting to a waiting state after completion of execution of the data reading and data processing operations.

* * * * *

UNITED STATES PATENT AND TRADEMARK OFFICE
CERTIFICATE OF CORRECTION

PATENT NO. : 4,897,807
DATED : January 30, 1990
INVENTOR(S) : Toshifumi Ohsawa

It is certified that error appears in the above-identified patent and that said Letters Patent is hereby corrected as shown below:

COLUMN 8:

Line 22, "and," should read --and--.

Line 24, "presence" should read --the presence--.

COLUMN 9:

Line 2, "first" should read --said first--.

Signed and Sealed this

Twenty-third Day of July, 1991

*Attest:*

HARRY F. MANBECK, JR.

*Attesting Officer*     *Commissioner of Patents and Trademarks*